United States Patent
Embry

(10) Patent No.: US 7,509,925 B2
(45) Date of Patent: Mar. 31, 2009

(54) CURRY SHAMPOO COMB

(76) Inventor: Jill Mari Embry, 5455 Armour Dr., Somerville, TN (US) 38068

( * ) Notice: Subject to any disclaimer, the term of this patent is extended or adjusted under 35 U.S.C. 154(b) by 112 days.

(21) Appl. No.: 11/328,751

(22) Filed: Jan. 10, 2006

(65) Prior Publication Data

US 2006/0153625 A1 Jul. 13, 2006

Related U.S. Application Data

(60) Provisional application No. 60/642,663, filed on Jan. 10, 2005.

(51) Int. Cl.
*A01K 13/00* (2006.01)
(52) U.S. Cl. ..................................... 119/603
(58) Field of Classification Search ............... 119/603, 119/600, 604, 665, 650, 652; 251/148; 201/289; 401/289; 15/24, 29, 31, 50.1, 50.2, 50.3, 15/51, 52
See application file for complete search history.

(56) References Cited

U.S. PATENT DOCUMENTS

| | | | |
|---|---|---|---|
| 2,250,878 A | | 7/1941 | Quaranti |
| 4,171,169 A | * | 10/1979 | Williams ................... 401/41 |
| 4,575,270 A | * | 3/1986 | Hammond .................. 401/40 |
| 5,056,480 A | * | 10/1991 | Murray, Sr. ................ 132/114 |
| D331,840 S | | 12/1992 | Garner |
| 5,649,334 A | * | 7/1997 | Henriquez et al. ............. 15/29 |
| 5,649,502 A | * | 7/1997 | Frank ........................ 119/665 |
| 6,047,703 A | | 4/2000 | Paglericcio et al. |

(Continued)

*Primary Examiner*—Michael R Mansen
*Assistant Examiner*—Monica L Williams

(74) *Attorney, Agent, or Firm*—Sarah Osborn Hill; Wyatt, Tarrant & Combs, LLP

(57) ABSTRACT

A pet bathing product for the shampooing or bathing of pets, including dogs and horses. The inventive device includes a distribution head that is attached to a hose and an additive reservoir that allows for the sudsing of the coat directly through the comb. The device has a handle designed to fit easily in the hand while currying a pet. A fluid hose or other fluid supply system is attached, either directly or through an adaptor, to a fluid conduit which runs through the device and directs fluid and/or additive to the curry head. A shutter is located between the fluid conduit and the additive reservoir which can be turned on or off to allow fluid to flow past the additive reservoir. When the shutter open position is selected, the shutter allows additive to diffuse into the stream of fluid. The additive/fluid mixture is applied to the pet through the holes in the distribution head. When the shutter is turned to the off position, fluid flows past it without additive being dispensed. In one embodiment, the reservoir is split into a first additive chamber and a second additive chamber which contain different additives. When the first additive chamber is selected by turning the filter to the first position, the fluid stream flows past the first additive chamber allowing the first additive to diffuse into the stream of fluid. When the second additive chamber is selected by turning the filter to the second position, the fluid stream flows past the second additive chamber allowing the second additive to diffuse into the stream of fluid. Massaging projections such as curry comb teeth attach to the distribution plate to allow for direct contact on the pet while sudsing and rinsing. There may be holes in the tips of the massaging projections and/or on the face of the distribution plate. The size of the massaging projections on the distribution plate varies according to the user's needs.

18 Claims, 10 Drawing Sheets

U.S. PATENT DOCUMENTS 6,367,421 B1     4/2002    Deacon
6,575,429 B2 *   6/2003    Paine .......................... 251/148
6,651,588 B1 *   11/2003   Penzimer ................... 119/604
6,718,913 B1     4/2004    Stupar
6,793,434 B1     9/2004    Olson
6,827,039 B1 *   12/2004   Nelson ....................... 119/604

* cited by examiner

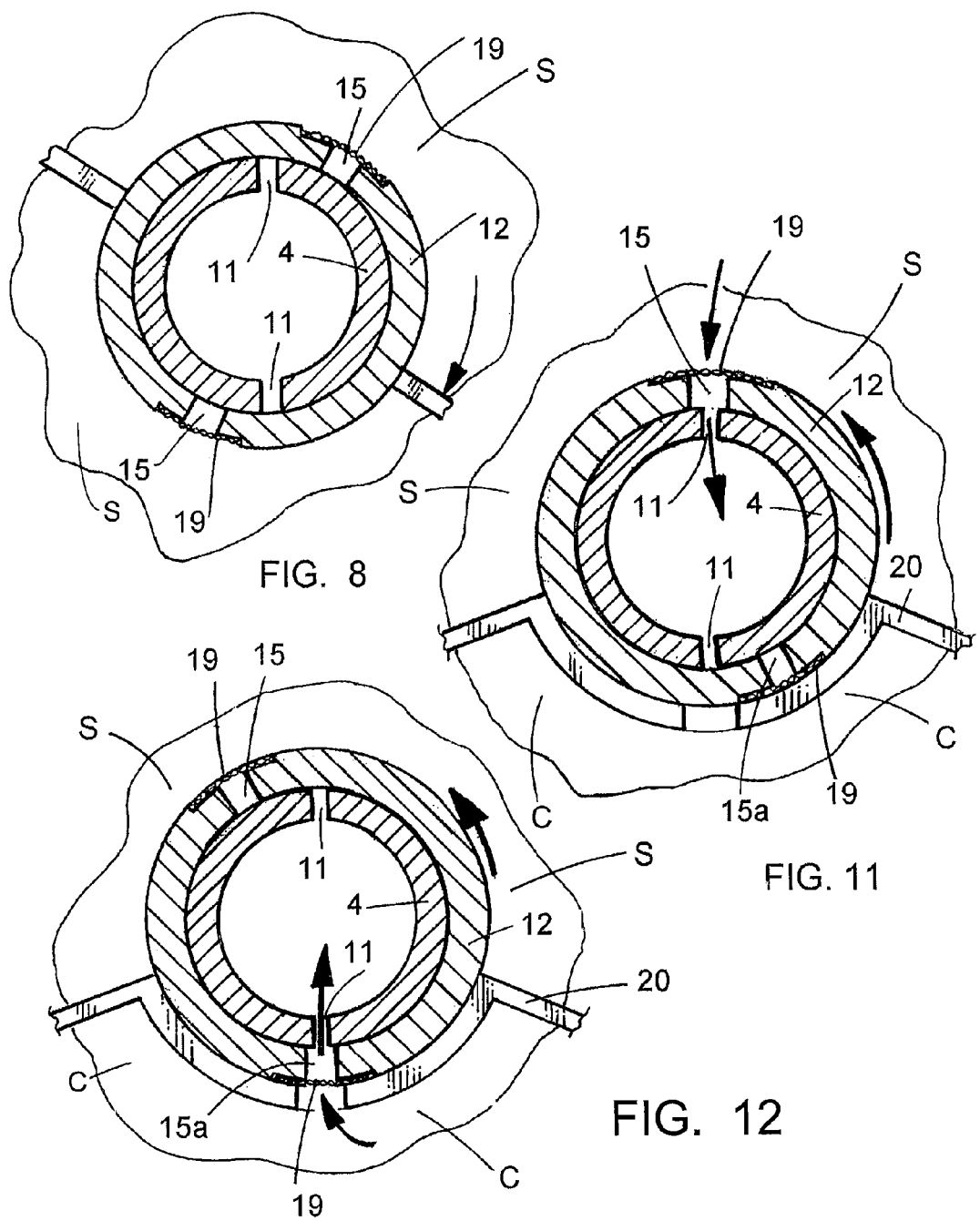

CURRY SHAMPOO COMB

CROSS REFERENCE TO RELATED APPLICATIONS

Applicant claims priority to the following related provisional application: U.S. Provisional Patent Application Ser. No. 60/642,663, filed Jan. 10, 2005, the full disclosure of which is hereby incorporated by reference.

STATEMENT REGARDING FEDERALLY SPONSORED RESEARCH OR DEVELOPMENT

Not applicable

REFERENCE TO MICROFICHE APPENDIX

Not applicable

FIELD OF THE INVENTION

The present invention relates generally to curry bath combs and more specifically it relates to a curry shampoo comb for the grooming or bathing of pets, including dogs and horses. Generally, a curry comb is defined as a comb usually with stiff teeth which is used for grooming, massaging, and removing loose dirt and hair from the coat or hide of animals.

BACKGROUND OF THE INVENTION

It can be appreciated that pet bathing products have been in use for years. Typically, pet bathing products are comprised of products that consist of a faucet or hose attachment that will disperse shampoo using a pressure system to siphon the shampoo out of a bottle and disperse it through a hose sprayer, for example the Rio Vista Products/WorldChem Horse and Pet Wash System, a joint venture of Rio Vista Products, Santa Maria, Calif. and Hydro Systems Company, Cincinnati, Ohio. There is also commercially available the Beaver River Wash Wand, by Beaver River Associates, Pawlet, Vt., which is a wand that is attached to a hose and disperses water and scrapes/loosens the shedding fur while washing. Another product which exists is a plastic curry with a hose attachment, by Champion Turf. This system includes a curry mitt that has a threaded attachment for a hose.

The main problem with conventional pet bathing products is that they address only one challenge of a single bathing of a pet at a time. Another problem not addressed is that some curry systems are not easily transportable from one location to another, either in the same facility or to a different location. The Rio Vista product does not have a curry system to allow for close contact to the animal's skin. Another problem with conventional pet bathing products is that some, such as Champion Turfs plastic curry and Beaver River's Wash Wand do not have a shampooing option. Another shortcoming with conventional pet bathing products is that some, including the Rio Vista Horse and Pet Wash System, do not have attachments to allow for shampooing close to the skin and even distribution of suds. Some systems are also wall mount units, and thus are not transportable.

U.S. Pat. No. 6,047,703 discloses a human hair brush to be used for dispensing shampoo or conditioner on the hair when brushing. The brush head has a hollow handle and hollow chamber in the brush head which contains the liquid. It also has hollow teeth with holes in them allowing the liquid to seep out. The teeth are removable and come in a variety of sizes. The liquid flows from the handle chamber to the head chamber by a pumping mechanism such as the user squeezing the handle or a trigger which activates a piston.

U.S. Pat. No. 6,827,039 discloses an animal grooming device which dispenses water and shampoo or conditioner, including a squeegee device to facilitate removing the water and soap from the animal and may include a grooming attachment. The tool may also include a valve which controls the liquid flow. The reservoir containing the shampoo or conditioner is not integrally connected to the operative tool making the system cumbersome to use. Shampoo and conditioner may be mixed into the water by creating turbulence in the water stream. The shampoo or conditioner is suctioned into the water stream by means of user induced vacuum, i.e. the user places their thumb over a hole in the suction pipe.

U.S. Pat. No. D331,840 discloses an ornamental design for a pet brush attachment to a water hose.

U.S. Pat. No. 2,250,878 discloses a shampoo brush with a chamber in the head for shampoo and a hose attachment for water in the handle. Both the flow of water and shampoo can be controlled. However, since the shampoo and water are separately dispensed, the method of controlling the shampoo flow rate involves restricting flow to those openings in the brush head near the top of the brush and does not endure thorough mixing with the water.

U.S. Pat. No. 5,649,502 discloses a device for washing an animal which attaches to a water source. It includes a chamber for shampoo and massaging teeth. The water and shampoo flows are controlled together via a trigger on the handle which adjusts the water pressure or by adjusting the water pressure at the source. Shampoo flow is only stopped when the shampoo container is removed or emptied.

U.S. Pat. No. 6,367,421 discloses a pet brush and solution dispenser. The handle of the brush is hollow and can be filled with shampoo or other pet grooming liquid. To dispense the liquid, the user pushes a trigger on the brush head which pumps the solution through the head cavity and out the designated openings.

U.S. Pat. No. 6,793,434 discloses a grooming brush with an open cavity which is filled with a sponge. The sponge is inserted into water or a mixture of water and shampoo until saturated prior to being inserted in the open cavity. The brush has orifices on the bottom through which the liquid flows onto the animal. The brush also has bristles which facilitate the grooming process.

U.S. Pat. No. 6,718,913 discloses an animal grooming brush which connects to a water supply or a supply of water and soap mixture. The supply line is connected to the brush handle and the water or soap and water mixture is pumped or forced via water pressure through multiple channels in the brush head and out through holes on the brush head face.

None of these devices are all encompassing of the many aspects of shampooing or bathing of pets, including dogs and horses. One of the main issues that is not addressed in one device is durability. Another issue that is not addressed is close contact with the animal's skin, and thus the ability to get beneath the coat or fur of the animal. Another problem is that some of the devices do not have a shampooing option. And another issue not addressed in some of the devices is that they are not easily manipulated or transportable. Further, the typical device which allows both water and shampoo flow through the brush either does not allow for independent control of the flow rates of water and shampoo or requires the user to squeeze a trigger, or perform some other pumping action, during the grooming process to control the flow rate. The current devices do not allow the user to easily switch from water only to a water and soap mixture during the grooming process. There is also no product which contains multiple chambers for additives allowing the user to dispense water, water mixed with additive one and then water mixed with additive two in the same application.

In these respects, the curry shampoo comb according to the present invention substantially departs from the conventional concepts and designs of the prior art, and in so doing provides an apparatus primarily developed for the purpose of the shampooing or bathing of pets, including dogs and horses which addresses all of the above mentioned challenges in one device.

SUMMARY OF THE INVENTION

In view of the foregoing disadvantages inherent in the known types of pet bathing products now present in the prior art, the present invention provides a new curry shampoo comb construction wherein the same can be utilized for the shampooing or bathing of a wide variety of pets, including dogs and horses.

The general purpose of the present invention, which will be described subsequently in greater detail, is to provide a new curry shampoo comb that has many of the advantages of the pet bathing products mentioned heretofore and many novel features that result in a new pet bathing product which are not anticipated, rendered obvious, or suggested by any of the prior art of pet bathing products, either alone or in any combination thereof.

To attain this, the present invention generally comprises a curry comb distribution head section that is attached to a hose and an additive reservoir that allows for the sudsing of the coat directly through or adjacent to the comb. The device has a handle designed to fit easily in the hand while currying a pet. A water hose or other water supply system is attached, either directly or through an adaptor, to a fluid conduit which runs through the device and directs water and/or additive to the curry distribution head. A shutter is located between the fluid conduit and the additive reservoir which can be turned on or off to allow water to flow past the additive reservoir. When the shutter open position is selected, the shutter allows additive to diffuse into the stream of water. The additive/water solution is applied to the pet through the holes in the distribution plate. When the shutter is turned to the off position, water flows past it without additive being dispensed. In one embodiment, there is a first additive reservoir and a second additive reservoir. When the first additive chamber is selected by turning the shutter to the first additive position, the water stream flows past the first additive reservoir allowing the first additive to diffuse into the stream of water. When the second additive chamber is selected by turning the shutter to the second additive position, the water stream flows past the second additive reservoir allowing the second additive to diffuse into the stream of water. Massage projections are attached to the device to allow for direct contact on the pet while sudsing and rinsing. There may be holes in the tips of the massage projections and/or on the face of the head through which the additive/water solution or water are supplied. The size of the massaging projections on the distribution plate varies according to the user's needs.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object of the present invention is to provide a curry shampoo comb for the shampooing medicating, treating or bathing of pets, including dogs and horses.

Another object is to provide a curry shampoo comb that allows for currying while shampooing and rinsing the coat of animal.

Another object is to provide a curry shampoo comb which facilitates the grooming process by dispensing an additive and/or fluid without requiring the user to hold down a trigger or other pumping device.

Another object is to provide a curry shampoo comb that allows for even distribution of an additive in the animal's coat.

Another object is to provide a curry shampoo comb that allows for thorough rinsing of coat, down to skin.

Another object is to provide a curry shampoo comb that allows for the immediate loosening and rinsing of dirt.

Another object is to provide a curry shampoo comb that conserves the use of additive.

Another object is to provide a curry shampoo comb that allows for the additive of choice to be used.

Another object is to provide a curry shampoo comb that allows the user to dispense a first additive and a second additive at different times during the grooming process without changing curry combs.

These and other objects and advantages of the present invention will become obvious to the reader from the following general and preferred description of the invention and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

The accompanying drawings, which are incorporated in and constitute a part of this specification, illustrate embodiments of the invention and, together with a general description of the invention given above and the detailed description of the preferred embodiments given below, serve to explain the principles of the invention.

FIG. 8 is a sectional view of the shutter assembly taken along the same plane as FIG. 7, which; however, illustrates the lack of diffusion of additive from the reservoir chamber into the fluid conduit when the shutter is closed.

FIG. 11 is a sectional view similar to FIG. 7 which illustrates an alternate embodiment with two reservoir chambers where there is a flow by diffusion of additive S from the first reservoir additive chamber into the fluid conduit when additive S is selected.

FIG. 12 is a sectional view similar to FIG. 11 which illustrates an alternate embodiment with two reservoir chambers where there is flow by diffusion of additive C from the second reservoir additive chamber into the fluid conduit when additive C is selected.

PREFERRED EMBODIMENTS OF THE INVENTION

Figure 1:
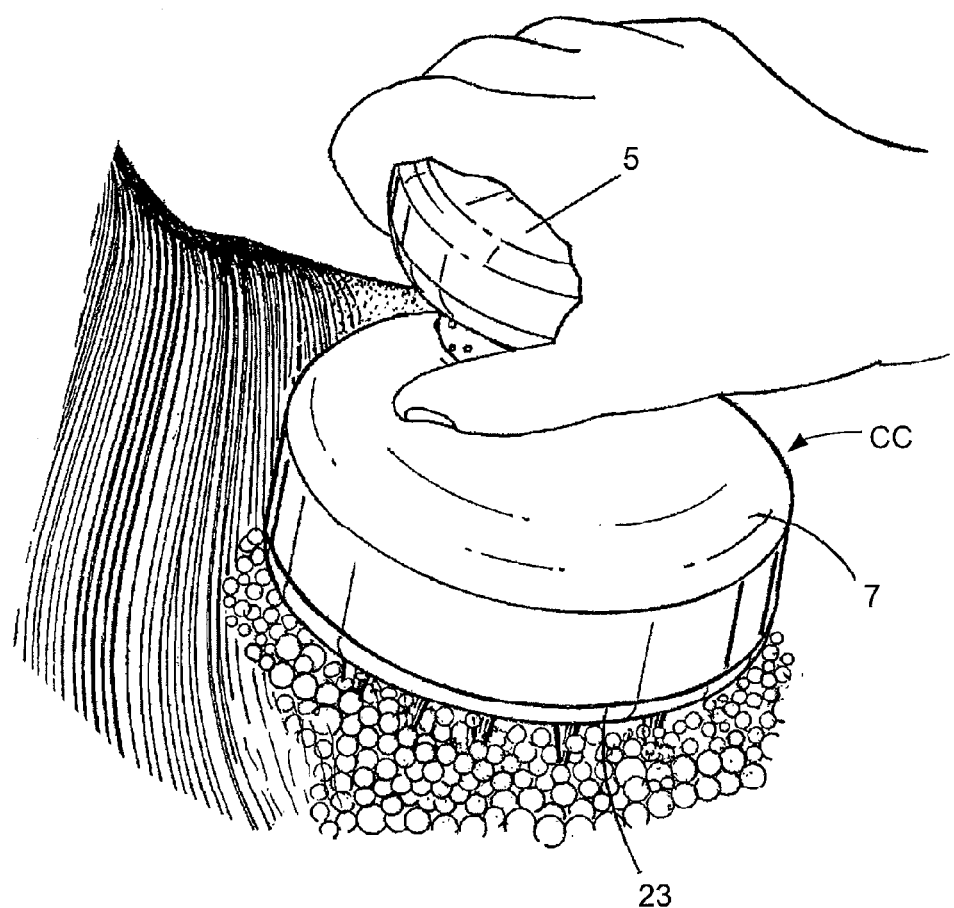
FIG. 1 is a pictorial view which shows the curry shampoo comb of the present invention being used to bathe and curry a horse.
Figure 2:
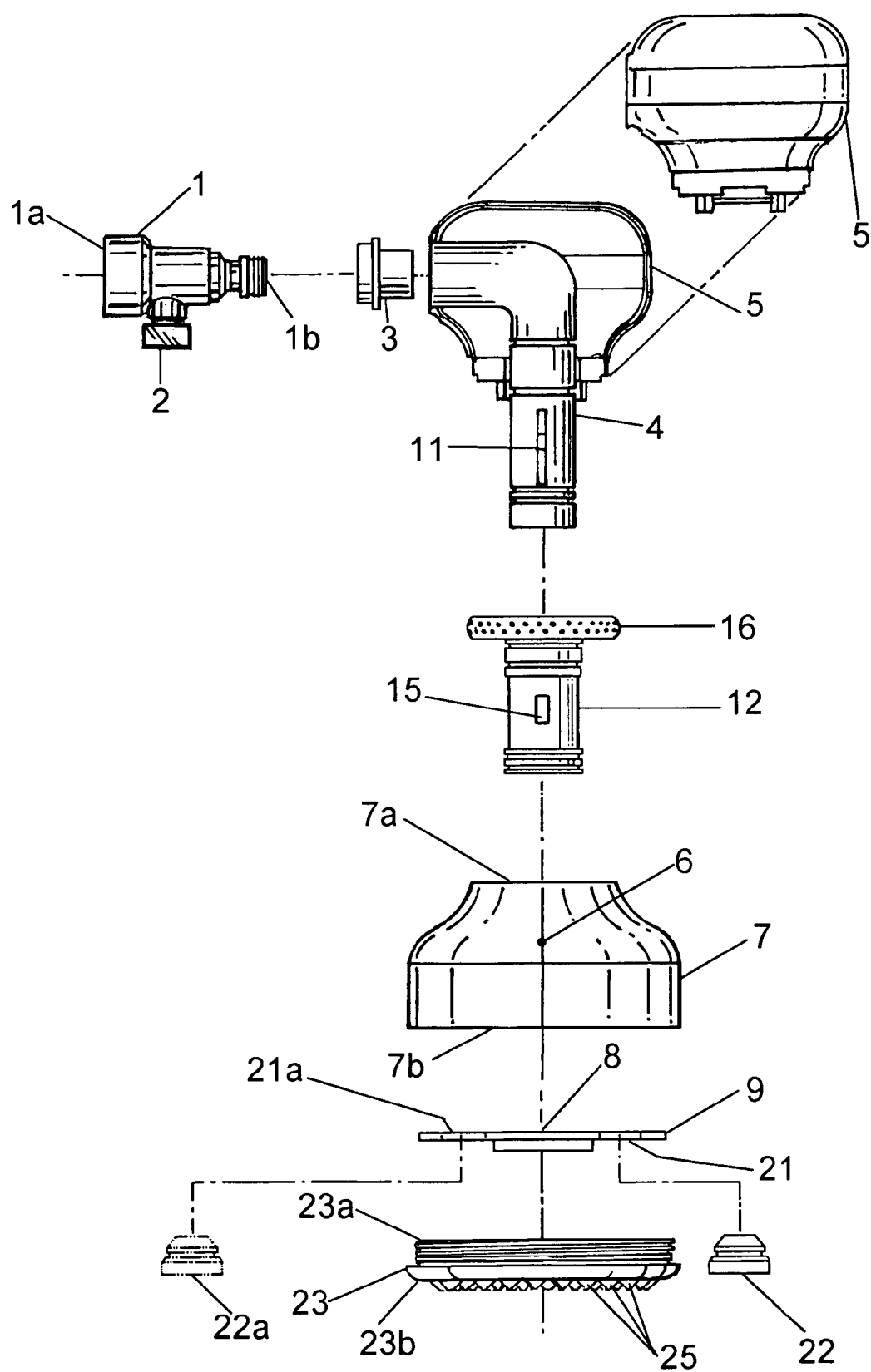
FIG. 2 is an exploded view of the components of the curry shampoo comb shown in FIG. 1.

FIG. 1 illustrates grooming with the curry shampoo comb CC. In the preferred embodiment, a handle 5 has a grip portion (not shown) in order to hold the curry shampoo comb CC and rotate it while washing an animal. In the preferred embodiment, said handle 5 is an oval shape which is slightly smaller than a reservoir housing 7, but it could be any shape which easily allows the user to hold it while currying the animal. Referring now to FIG. 2 which illustrates an exploded view of the components of the curry shampoo comb CC, said handle 5 is attached to a closed side 7a of said reservoir housing 7 and fits easily into the hand allowing the user to groom the animal. In the preferred embodiment as shown in FIG. 2, an inlet coupling 3 is located on the side of the handle 5 for ease of movement, but in other embodiments it could be located in another position, such as the top, if that would be beneficial to the user.

Hose adaptor 1 has a first end 1a and a second end 1b and connects at said first end 1a to a standard fluid supply via a conventional fitting such as a threaded fitting or quick-connect device. Said second end 1b of hose adaptor 1 reduces down to the size of inlet coupling 3, which is smaller as a matter of convenience to the construction of the present embodiment. Said second end 1b of said hose adapter 1 connects to said inlet coupling 3 via a conventional fitting such as a traditional threaded garden hose fitting in the preferred embodiment. In the preferred embodiment, said inlet coupling 3 is sized to fit a standard garden water hose, but in other embodiments said inlet coupling 3 could be of any user specified size in order to connect directly with the user's fluid supply. Valve 2 is situated so that it can be conveniently used to variably adjust the flow rate of the incoming fluid and includes an on and off position. In the preferred embodiment, valve 2 is located at the hose adapter 1 inlet. Inlet coupling 3 is attached to fluid conduit 4.

Figure 3:
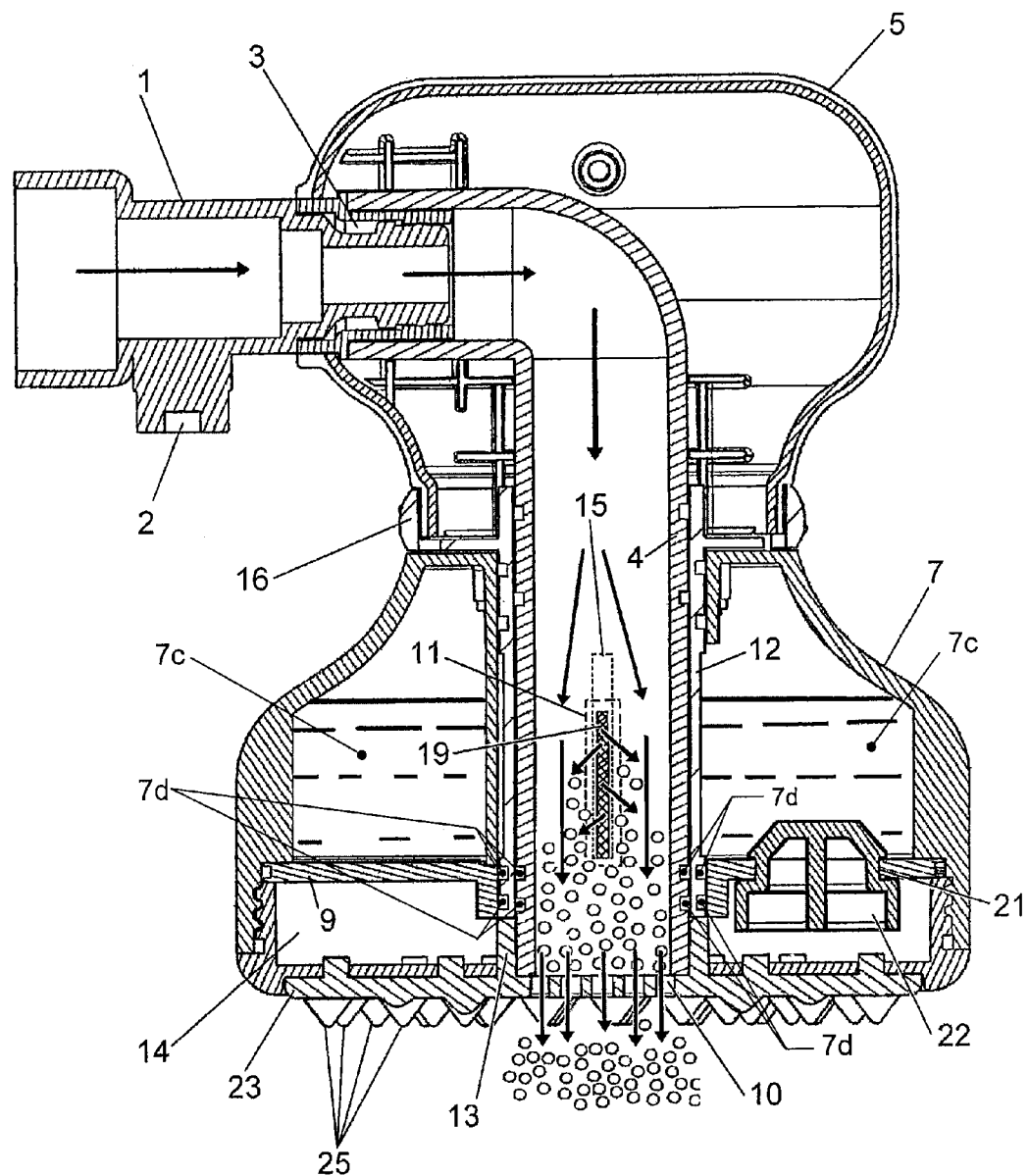
FIG. 3 is a cross sectional view of the curry shampoo comb of FIG. 1 and FIG. 2 and shows the direction of flow of fluid and additive through the comb.

Fluid conduit 4 extends generally centrally through the handle 5 and the center 6 of the reservoir housing 7, through the center 8 of reservoir cover plate 9. Referring now to FIG. 3 which shows a cross section of the curry shampoo comb CC, there is at least one window 11 in the side of fluid conduit 4 which provides an interface between said reservoir housing 7 and the fluid stream. In the preferred embodiment, fluid conduit 4 is a constant diameter and terminates at nozzle 10.

A shutter 12 surrounds fluid conduit 4 and is located intermediate to fluid conduit 4 and reservoir housing 7. Shutter 12 is of a size which exceeds that of the largest window 11 in fluid conduit 4. Fluid conduit 4 fits snugly into nozzle nipple 13 so as to prevent the escape of fluid/additive solution into distribution chamber 14. The inner diameter of shutter 12 is slightly greater than the outer diameter of fluid conduit 4 such that shutter 12 may rotate around, as in the preferred embodiment, or slide across fluid conduit 4. At least one window 15 is cut into shutter 12 providing an interface between reservoir housing 7 and fluid conduit 4. Windows 11 and 15 are positioned so they can be aligned by rotating shutter 12. In the preferred embodiment, the perimeter of window 15 is slightly larger than window 11.

As shown in FIG. 3, a mesh screen filter 19 is attached to the outside of shutter 12 such that said filter 19 covers all openings in said shutter 12. In the preferred embodiment said filter 19 is 1.25 inches in width by 1.5 inches in length. The mesh size of said filter 19 may vary, but is number 78 mesh with 0.0037 of an inch distance between the wires in the preferred embodiment. The mesh size is sufficient to allow an adequate diffusion of additive into the fluid stream for application to the animal. It is based on the viscosity of the additive. Those skilled in the art will recognize that more viscous additives may require larger mesh sizes and conversely, less dense additives may require a smaller mesh size. The filter 19 may be made of a variety of materials which allow for flexibility, durability, and a mesh size appropriate to allow diffusion of product from reservoir housing 7 into the fluid stream. It is made of stainless steel in the preferred embodiment.

Referring back to FIG. 2, the reservoir housing 7 has two ends, the closed end 7a and the open end 7b, and surrounds said fluid conduit 4, shutter 12, and filter 19 assembly. Said fluid conduit 4, shutter 12, filter 19 and reservoir housing 7 are assembled such that fluid enters at said closed end 7a and fluid/additive solution exits at said open end 7b. Said reservoir housing 7 is of a height which at least exceeds the height of windows 11 and 15. In different embodiments, said reservoir housing 7 will contain different volumes of product. In the preferred embodiment, said reservoir housing 7 is approximately five inches in diameter with a wall thickness of approximately one-sixteenth of an inch and reservoir chamber 7c (see FIG. 3) holds up to 8.5 ounces of additive; however, there is no limitation on the volume of said reservoir chamber 7c and it is set based on user preference, i.e. volume needed for one application or volume of one bottle of additive.

As shown in FIG. 2, said reservoir cover plate 9 fits over said open end 7b of said reservoir housing 7 to form reservoir chamber 7c (see FIG. 3). There is at least one opening 21 in said reservoir cover plate 9 which allows the user to insert an additive such as shampoo, conditioner, medication, or other pet grooming product to said reservoir chamber 7c. There is at least one plug 22 which seals the opening 21 in said reservoir cover plate 9 so that additive will not leak out during use. In the preferred embodiment, o-rings 7d are used to further seal reservoir chamber 7c and prevent additive leakage.

Since some fluid diffuses through the filter into said reservoir chamber 7c when said shutter positioner 16 is in the open position, both liquid and solid additives can be inserted into the reservoir and applied to the animal using the curry shampoo comb CC as the fluid will dissolve any solid additives in said reservoir chamber 7c. In an embodiment where the user desires to deposit solid versus liquid additives into said reservoir chamber 7c, the size of said windows 11 and 15 and the mesh size in said filter 19 may be larger. The increased size will allow more diffusion and increase the rate at which these solid products dissolve and diffuse into the water stream. A smaller size may be used for liquid additives as this will slow the diffusion rate and economically distribute the additive onto the animal.

Figure 4:
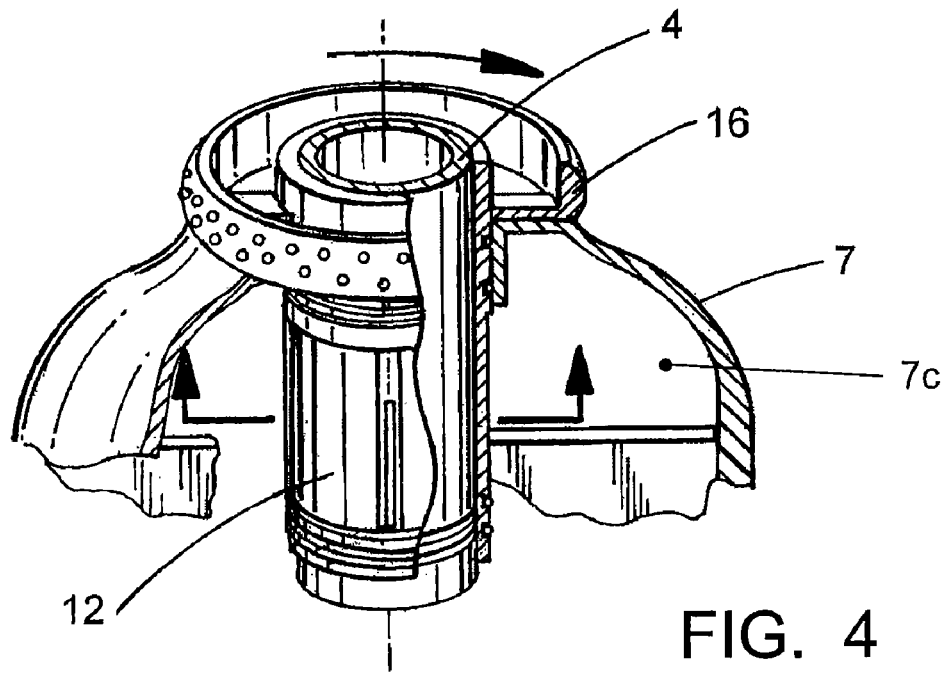
FIG. 4 is a partial pictorial view, partially cut away to illustrate the movement of the shutter with the shutter positioner and the inside of the reservoir housing.
Figure 16:
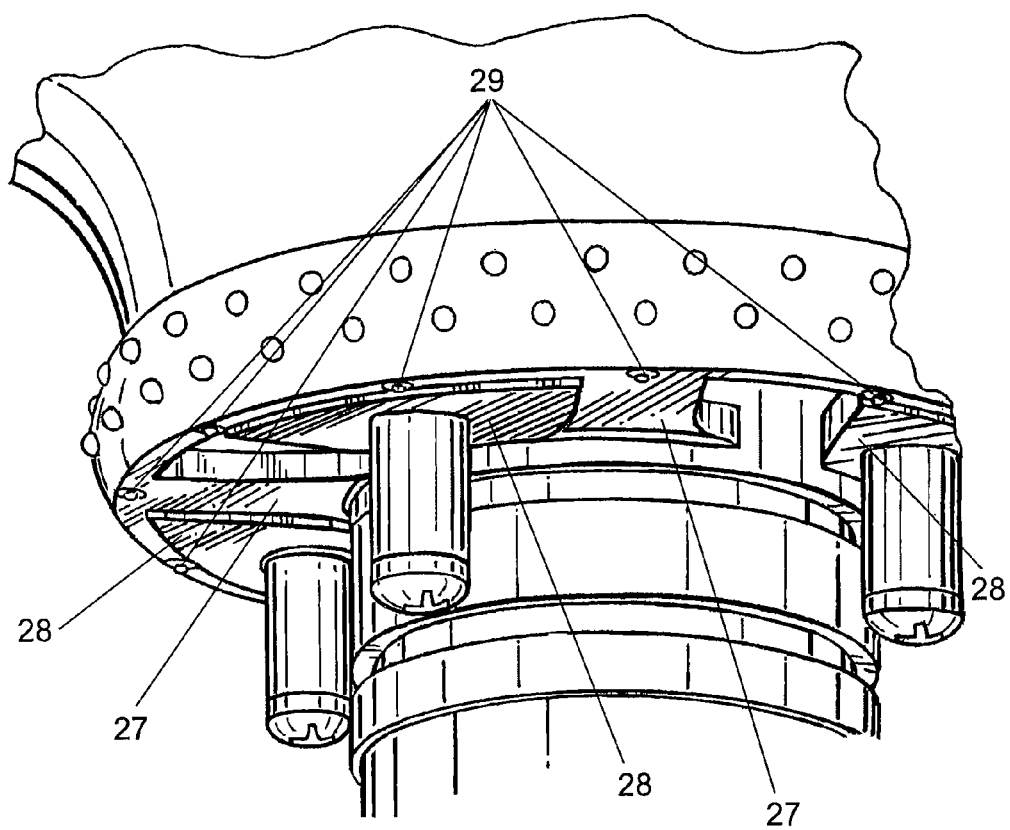
FIG. 16 is a cut away view of the shutter positioner of the curry shampoo comb which illustrates a means of stopping the positioner at the desired location.

Shutter positioner 16 is attached to shutter 12 and enables the user to rotate shutter 12 to the desired position, which may include open, closed, additive chamber one, or additive chamber two, by adjusting shutter positioner 16. FIG. 4 illustrates the movement of shutter 12 using shutter positioner 16. There are multiple retaining means to hold said shutter 12 in position which will be known to those skilled in the art. In the preferred embodiment, shutter 12 does not rotate freely around fluid conduit 4. Shutter 12 is selectively movable by the user between open and closed positions. There are raised nubs 29 on the underside of shutter positioner 16 which correspond to raised nubs (not shown) on the upper edge of reservoir housing 7. When the shutter is rotated, said raised nubs 29 on said shutter positioner 16 contact corresponding raised nubs (not shown) on reservoir chamber 7c creating additional resistance. Referring to FIG. 16, the range of rotation is limited by a cross member 27 that connects shutter positioner 16 to shutter 12 and tab 28 in handle 5. When said shutter 12 is rotated clockwise so that said cross member 27 contacts said tab 28, said shutter 12 can not be rotated any further. Similarly, when said shutter 12 is rotated counter-clockwise so that said cross member 27 contacts said tab 28, said shutter 12 can not be rotated any further.

Figure 7:
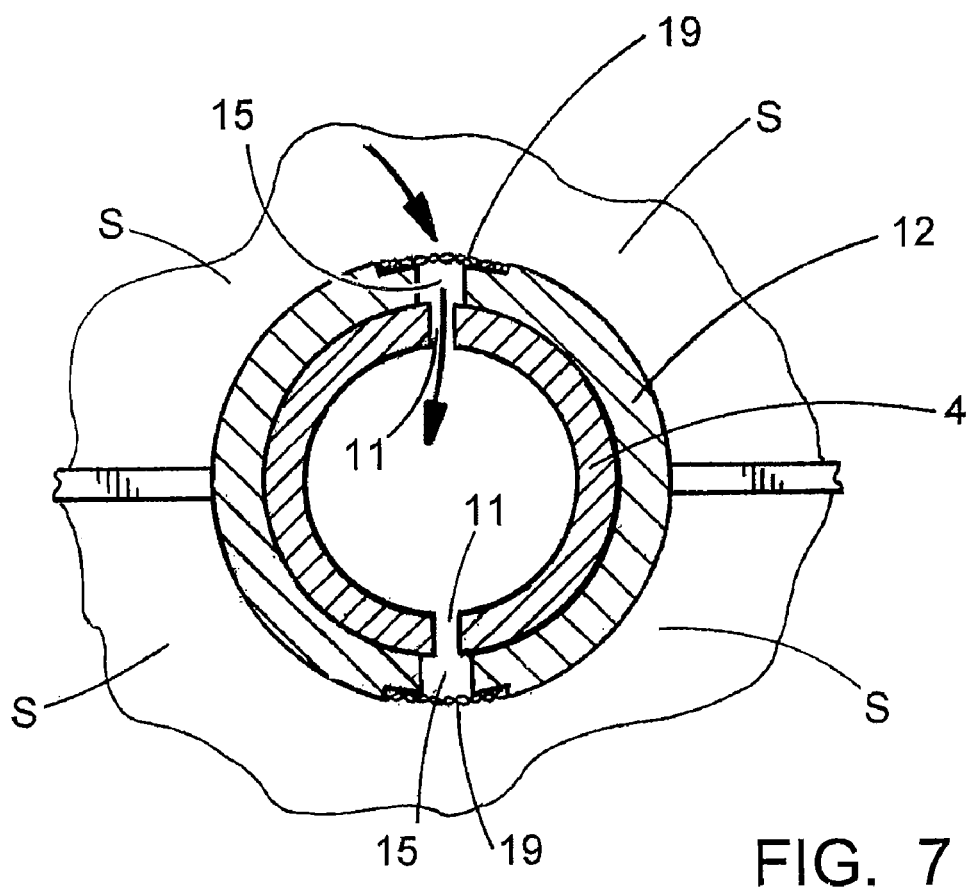
FIG. 7 is a sectional view of the shutter assembly taken along the place identified in FIG. 4, which illustrates the diffusion of additive from the reservoir into the fluid conduit when the shutter is open.
Figure 5:
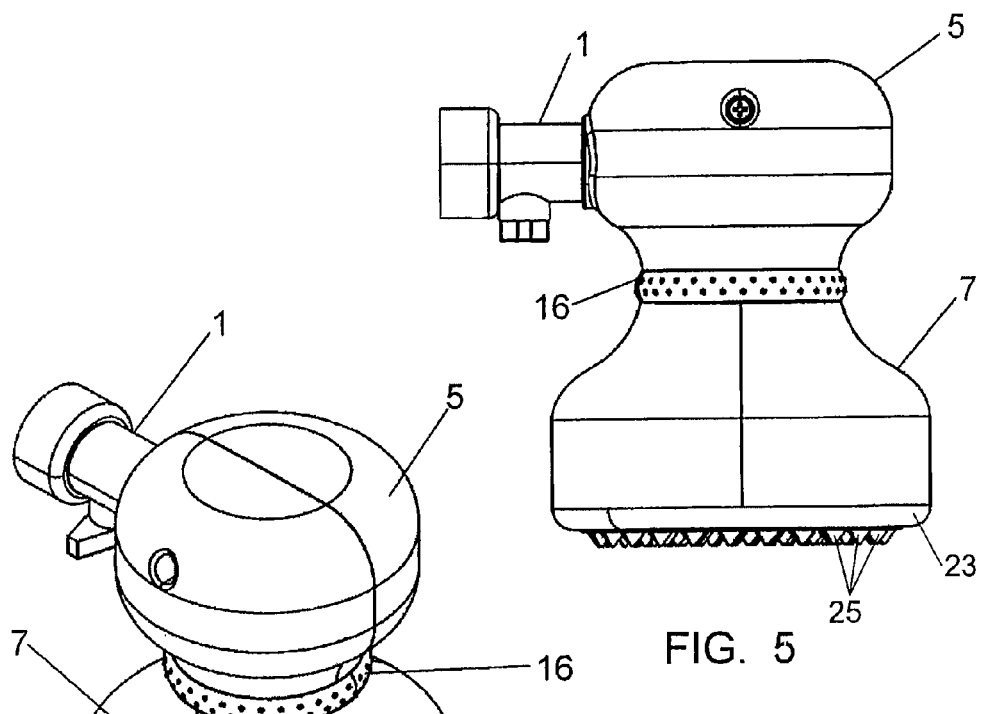
FIG. 5 is a side elevational view of the curry shampoo comb illustrated in the previous figures.
Figure 6:
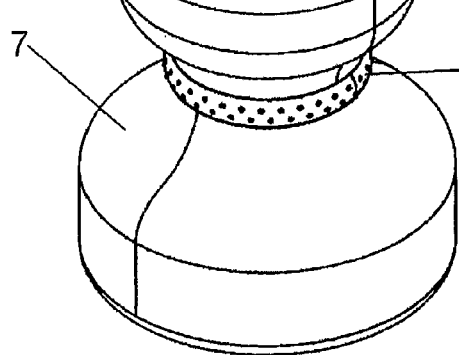
FIG. 6 is a pictorial view which shows the inventive curry shampoo comb from the top and side.

For example, when said shutter positioner 16 is set to the open position, the corresponding tab 28 contacts the corresponding cross member 27 and said windows 11 and 15 are aligned such that there is contact between the additive in reservoir chamber 7c and the fluid stream as in FIG. 7. When shutter positioner 16 is set to the closed position, the corresponding tab 28 contacts the corresponding cross member 27 and said windows 11 and 15 are not aligned; therefore, only fluid exits and the curry shampoo comb CC as in FIG. 8. There are many alternative types of stops known to those skilled in the art which could be employed to position said shutter 12 and the invention is not limited to the one described here.

When said fluid source is connected to said fluid conduit 4 and said valve 2 is set to allow flow, fluid passes through fluid conduit 4 and exits at nozzle 10. When windows 11 and 15 are aligned, additive from said reservoir chamber 7c diffuses through said filter 19 into the fluid stream passing through fluid conduit 4. As shown in FIG. 8, when windows 11 and 15 are not aligned, said reservoir chamber 7c is blocked and only fluid flows through said fluid conduit 4. This is a unique aspect of this invention which does not require the user to interact with the curry shampoo comb CC while washing the animal by pumping or squeezing the additive into the fluid stream.

Figure 9:
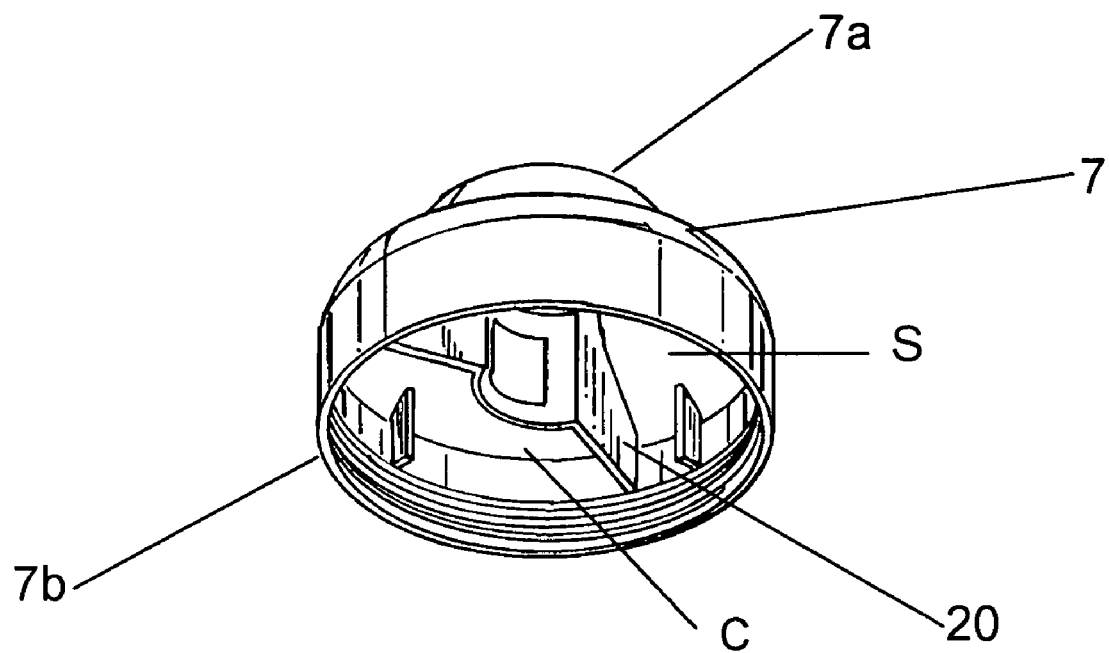
FIG. 9 is a pictorial view which illustrates a bottom view of the reservoir housing for an alternative embodiment wherein there are two reservoir additive chambers.
Figure 10:
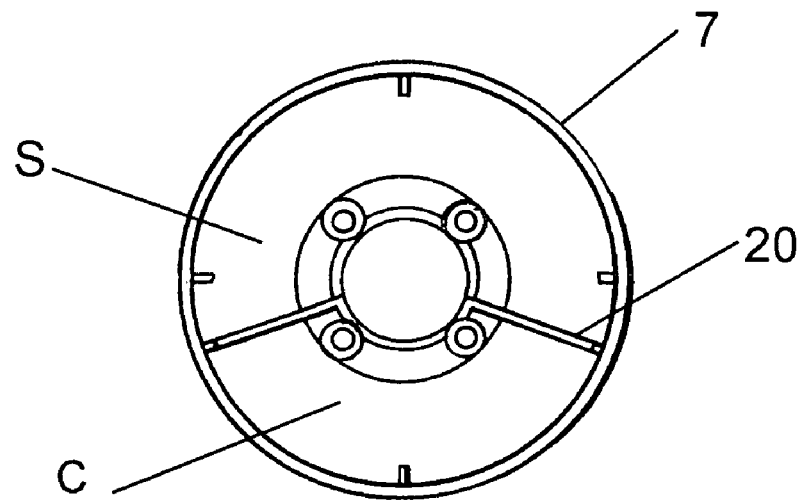
FIG. 10 is a bottom view of the inventive comb which illustrates the reservoir housing for an alternative embodiment with two reservoir additive chambers.
Figure 15:
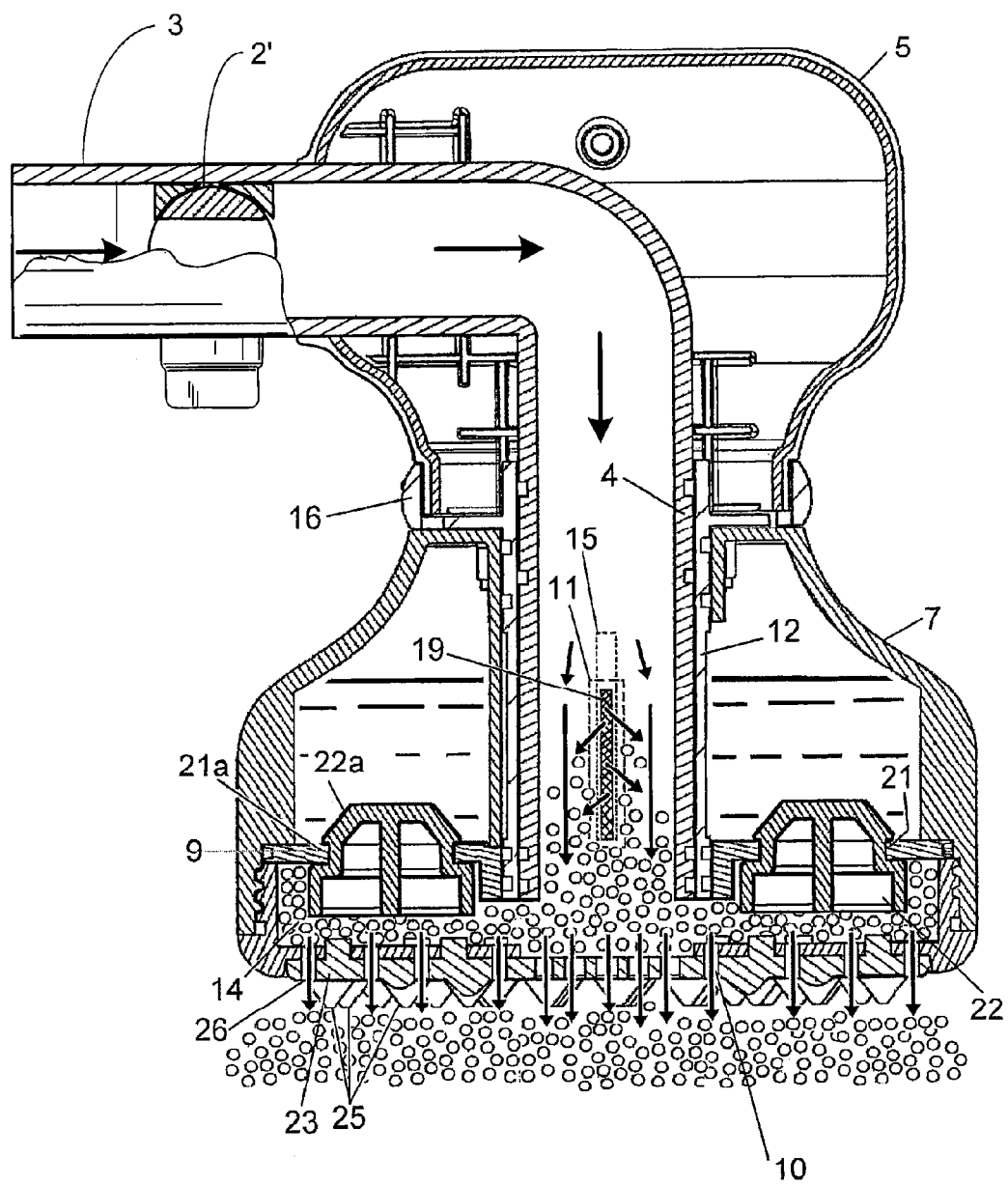
FIG. 15 is a cross sectional view showing an alternate embodiment of the curry shampoo comb and shows the direction of flow of fluid through the comb and additive added to the flow, all being dispersed through the head of the comb.

In one embodiment, shown by FIG. 9 and FIG. 10 which are bottom views of said reservoir chamber 7c, said reservoir chamber 7c is divided into at least two sections by divider 20 thus forming two reservoir additive chambers S and C inside reservoir chamber 7c. There are at least two openings 21 and 21a in said reservoir cover plate 9. Said opening 21 corresponds to said reservoir additive chamber S and said opening 21a corresponds to said reservoir additive chamber C. Openings 21 and 21a allow the user to insert a first additive into said reservoir additive chamber S and a second additive into said reservoir additive chamber C. There are at least two plugs 22 and 22a which seal the openings 21 and 21a in said reservoir cover plate 9 so that said first and second additives will not leak out during use. This is shown in FIG. 2 and FIG. 15.

In this embodiment, one of said windows 15 and 15a in said shutter 12 corresponds to each of said reservoir additive chambers S and C such that when said window 11 and said window 15 are aligned, the first additive in reservoir additive chamber S would diffuse through said filter 19 into said fluid stream. FIG. 11 shows this alternate embodiment where additive is diffusing from reservoir additive chamber S into fluid conduit 4 through filter 19 and windows 11 and 15 into the fluid stream. FIG. 12 shows this alternate embodiment where window 11 and window 15a are aligned, the second additive is diffusing from reservoir additive chamber C into fluid conduit 4 through filter 19 and windows 11 and 15a.

Referring back to FIG. 2, a distribution plate 23 has a top side 23a and a bottom side 23b. Said top side 23a includes a mechanism to attach said distribution plate 23 to said open end of said reservoir housing 7b. In the preferred embodiment, said mechanism is threading which allows said distribution plate 23a to be screwed into said open end of said reservoir housing 7b. Referring to FIG. 3, in the center of said top side of said distribution plate 23a is said nozzle nipple 13 which has a greater inner width than the outer width of said fluid conduit 4 such that said fluid conduit 4 fits snugly into said nozzle nipple 13.

Figure 13:
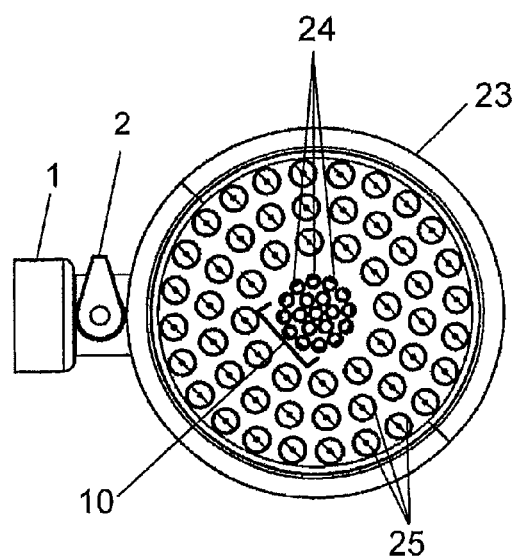
FIG. 13 is a bottom view of the curry shampoo comb.

Referring now to FIG. 13, which shows a bottom view of said curry shampoo comb CC, said nozzle 10 is also in the center of said distribution plate 23. Said nozzle 10 is a grouping of at least one hole 24 in said distribution plate 23 which allows the fluid to exit said distribution plate 23 on to the animal's skin. The size, geometric shape, and arrangement of said holes 24 which make up said nozzle 10 may vary depending on the needs of the user. In the preferred embodiment, the width of nozzle 10 is equivalent to the inner width of said fluid conduit 4.

On the bottom side of said distribution plate 23b are the massage projections 25. Said massage projections 25 may vary in shape, size, and configuration depending on the size of the animal, the type of coat, or other needs of the user. In the preferred embodiment, said massage projections 25 are conical in shape and cover the entire bottom surface of said distribution plate 23b with the exception of the portion taken up by said nozzle 10. Said massage projections 25 may be solid or may be hollow with a hole in the tip to allow water to pass through. In embodiments where said massage projections 25 are hollow, said massage projections 25 will be attached to a hole in said distribution plate 23 so that fluid can flow through said massage projections 25. In the preferred embodiment, said massage projections 25 are made of a thermoplastic elastomer (TPE) with an overmold of a thermoplastic such as acrylonitrile butadiene styrene (ABS), but they could be made of any suitable durable or elastomeric material. In the preferred embodiment, said distribution plate 23 is removable so that heads with different size and configuration of holes 24 and 26 and massage projections 25 may be attached to said reservoir housing 7.

Figure 14:
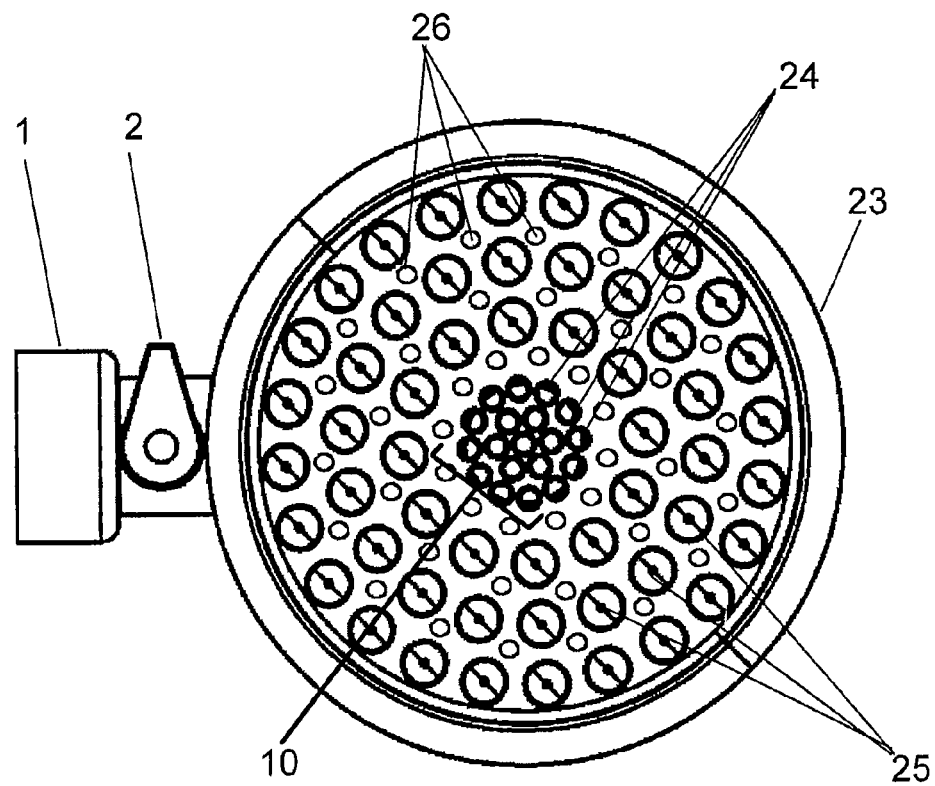
FIG. 14 is a bottom view of an alternate embodiment of the curry shampoo comb.

Referring now to FIG. 14 which shows a bottom view of an alternate design for the distribution plate 23 of the shampoo curry comb. In one embodiment there may be additional holes 26 in said distribution plate 23 to allow solution to pass though holes 26 onto the animal's skin. The size, geometric shape, and placement of said holes 26 may vary depending on the needs of the user. In the embodiments where there are holes in said massage projections 25 or additional holes 26 in said distribution plate 23, said fluid conduit 4 would terminate just past said reservoir cover plate 9. Said nozzle nipple 13 would be eliminated allowing the fluid to fill the entire distribution chamber 14 between said reservoir cover plate 9 and said distribution plate 23. This embodiment is shown in FIG. 15.

The curry shampoo comb CC may be made from any durable, moldable material. In the preferred embodiment the majority of the curry shampoo comb CC parts are made of a thermoplastic such as acrylonitrile butadiene styrene (ABS). The materials used to construct the filter 19 and massage projections 25 are discussed above. The handle 5 and shutter positioner 16 are made of ABS overmolded with thermoplastic elastomer (TPE). The plug 22 is made from TPE. Any moldable thermoplastic material may be used to fabricate the curry shampoo comb CC, so long as it provides structural integrity to the parts while functioning. While it is possible to manufacture the invention out of metals, the costs associated with metal fabrication may be prohibitive.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. A curry shampoo comb for dispensing a fluid from an attachable fluid source comprising:
    a handle section having a centrally located axis, said handle section attached to a fluid inlet coupling for connecting to an external fluid source;
    a reservoir section coupled to said handle section and sharing said centrally located axis with said handle section;
    a distribution head section attached to said reservoir section having a distribution chamber and a distribution plate; said distribution chamber disposed within said distribution head section for distributing fluid across said distribution plate;
    at least one hole in said distribution plate for dispensing said fluid from said comb;
    a fluid conduit with a first end and a second end and sharing said centrally located axis with said handle section and said reservoir section; said first end of said fluid conduit connected to said fluid inlet coupling; said second end of said fluid conduit connected to said distribution chamber; said fluid conduit intersecting said handle section and said reservoir section; said reservoir section surrounding a portion of said fluid conduit;
    a reservoir chamber adjacent to said fluid conduit and disposed within said reservoir section for receiving an additive;
    at least one window in said fluid conduit, located adjacent to said reservoir chamber in said reservoir section;
    at least one opening in said reservoir chamber adjacent to said fluid conduit; said window in said fluid conduit aligned with said opening in said reservoir chamber providing a connection therebetween such that said additive in said reservoir chamber is transferred into said fluid conduit by diffusion and some of a fluid from said fluid conduit is transferred into said reservoir chamber thereby displacing some of said additive; and
    a shutter intermediate to said fluid conduit and said reservoir section and sharing said centrally located axis with said handle section, said fluid conduit and said reservoir section; said shutter rotatable about said shared axis and capable of selectively covering said window precluding the diffusion of additive from said reservoir chamber into said fluid conduit, said shutter having therein at least one window said window in said shutter alignable with said window in said fluid conduit and said opening in said reservoir chamber;
    at least one mesh diffusion filter having a plurality of apertures for metering said additive into said fluid conduit, said diffusion filter attached to said shutter covering each of said windows of said shutter, said plurality of apertures of a size particular to the type of said additive; said diffusion filter intermediate to said reservoir chamber and said fluid conduit when said opening, said fluid conduit window and said shutter window are aligned and thus controlling the rate of diffusion of fluid between said reservoir chamber and said fluid conduit.

2. The curry shampoo comb of claim 1 further comprising said distribution plate having a bottom side;
    a plurality of massage projections attached to said bottom side of said distribution plate.

3. The curry shampoo comb of claim 2 further comprising:
    said distribution plate having a plurality of holes for dispensing fluid from said comb;
    said plurality of massage projections each having a first end, a second end and a channel; said channel extending the length of said projection;
        said first end fixed to said bottom side of said distribution plate;
        said channel connected to one of said plurality of holes; and
        said fluid in said distribution chamber traverses said channel and exits through said second end of said massage projections.

4. The curry shampoo comb of claim 1 further comprising a plurality of holes in said distribution plate being centrally located forming a nozzle;
    a coupling intermediate to said distribution chamber and said distribution plate attached centrally to said distribution plate surrounding said nozzle; and
    said second end of said fluid conduit fits snugly inside said coupling such that fluid exiting said distribution head exits through said nozzle.

5. The curry shampoo comb of claim 2 further comprising:
    an adaptor having a first end and a second end
        said first end attaches to a fluid supply; and
        said second end connected to said fluid inlet coupling.

6. The curry shampoo comb of claim 2 further comprising:
    a valve intermediate to said fluid inlet coupling and said fluid conduit;
        said valve capable of regulating fluid flow between zero flow and maximum flow.

7. The curry shampoo comb of claim 5 further comprising:
    a valve intermediate to said first end and said second end of said adaptor;
        said valve capable of regulating fluid flow between zero flow and maximum flow.

8. A curry shampoo comb for dispensing a fluid from an attachable fluid source comprising:
    a handle section having a centrally located axis, said handle section attached to a fluid inlet coupling for connecting to an external fluid source;

a reservoir section coupled to said handle section and sharing said centrally located axis with said handle section;

a distribution head section attached to said reservoir section having a distribution chamber and a distribution plate; said distribution chamber disposed within said distribution head section for distributing fluid across said distribution plate; at least one hole in said distribution plate for dispensing said fluid from said comb;

a fluid conduit with a first end and a second end and sharing said centrally located axis with said handle section and said reservoir section; said first end of said fluid conduit connected to said fluid inlet coupling; said second end of said fluid conduit connected to said distribution chamber; said fluid conduit intersecting said handle section and said reservoir section; said reservoir section surrounding a portion of said fluid conduit;

a plurality of reservoir additive chambers each having an opening, each of said plurality of reservoir additive chambers adjacent to said fluid conduit and disposed within said reservoir section for receiving a plurality of additives;

a plurality of windows in said fluid conduit, each of said windows aligned with one of said openings of said plurality of said reservoir additive chambers providing a connection therebetween such that said additive in said reservoir chamber is transferred into said fluid conduit by diffusion; and a shutter intermediate to said fluid conduit and said reservoir section and sharing said centrally located axis with said handle section, said fluid conduit and said reservoir section; said shutter rotatable about said shared axis and capable of selectively covering at least one of said plurality of windows precluding the diffusion of additive from at least one of said plurality of reservoir additive chambers into said fluid conduit, said shutter having therein at least one window said at least one window in said shutter alignable with said at least one windows in said fluid conduit and said at least one openings in said reservoir chamber;

at least one mesh diffusion filter having a plurality of apertures for metering said additive into said fluid conduit, said diffusion filter attached to said shutter covering each of said windows in said shutter, said plurality of apertures of a size particular to the type of said additive; said at least one diffusion filter intermediate to said reservoir chamber and said fluid conduit when at least one of said openings, at least one of said fluid conduit windows and at least one of said shutter windows are aligned and thus controlling the rate of diffusion of fluid between said reservoir chamber and said fluid conduit.

9. The curry shampoo comb of claim 8 further comprising said distribution plate having a bottom side;

a plurality of massage projections attached to said bottom side of said distribution plate.

10. The curry shampoo comb of claim 9 further comprising:

said distribution plate having a plurality of holes for dispensing fluid from said comb;

said plurality of massage projections each having a first end, a second end, and a channel; said channel extending the length of said projection;

said first end fixed to said bottom side of said distribution plate;

said channel connected to one of said plurality of holes; and said fluid in said distribution chamber traverses said channel and exits through said second end of said massage projections.

11. The curry shampoo comb of claim 8 further comprising a plurality of holes in said distribution plate being centrally located forming a nozzle;

a coupling intermediate to said distribution chamber and said distribution plate attached centrally to said distribution plate surrounding said nozzle; and said second end of said fluid conduit fits snugly inside said coupling such that fluid exiting said distribution head exits through said nozzle.

12. The curry shampoo comb of claim 9 further comprising:

an adaptor which has a first end and a second end where said first end attaches to a fluid supply; and said second end connected to said fluid inlet coupling.

13. The curry shampoo comb of claim 9 further comprising:

a valve intermediate to said fluid inlet coupling and said fluid conduit;

said valve capable of regulating fluid between from zero flow and maximum flow.

14. The curry shampoo comb of claim 12 further comprising:

a valve intermediate to said first end and said second end of said adaptor;

said valve capable of regulating fluid flow between zero flow and maximum flow.

15. A curry shampoo comb for dispensing a fluid from an attachable fluid source comprising:

a handle section having a centrally located axis, said handle section attached to a fluid inlet coupling for connecting to an external fluid source;

an adaptor having a first and a second end, said first end attachable to said external fluid source, said second end attached to said fluid inlet coupling;

a valve intermediate to said first end and said second end of said adaptor, said valve capable of regulating fluid flow between zero flow and maximum flow;

a reservoir section coupled to said handle section and sharing said centrally located axis with said handle section;

a distribution plate removably attached to said reservoir section; said distribution plate having a top, a bottom and a plurality of holes for dispensing fluid from said comb; said plurality of holes centrally located forming a nozzle;

a plurality of massage projections affixed to said bottom of said distribution plate;

a fluid conduit having a first end, a second end and a window, and sharing said centrally located axis with said handle section and said reservoir section, said first end of said fluid conduit connected to said fluid inlet coupling;

said second end of said fluid conduit adjacent to said top of said distribution plate;

said fluid conduit intersecting said handle section and said reservoir section; said reservoir section surrounding a portion of said fluid conduit;

a reservoir chamber disposed within said reservoir section for receiving an additive, said reservoir chamber adjacent to said fluid conduit and concentric to said reservoir section; said reservoir chamber having an opening adjacent to said fluid conduit;

said window in said fluid conduit located adjacent to said reservoir chamber in said reservoir section; said window in said fluid conduit aligned with said opening in said reservoir chamber providing a connection therebetween such that said additive in said reservoir chamber is transferred into said fluid conduit by diffusion;

a shutter having a window, said shutter intermediate to said fluid conduit and said reservoir section and enclosed within said reservoir section; said shutter axially aligned with said handle section, said fluid conduit and said reservoir section; said shutter rotatable about said fluid conduit and capable of selectively covering said window in said fluid conduit precluding the diffusion of additive from said reservoir chamber into said fluid conduit, said window in said shutter alignable with said window in said fluid conduit and said opening in said reservoir chamber; and a mesh diffusion filter having a plurality of apertures for metering said additive into said fluid conduit, said diffusion filter attached to said shutter and covering said window in said shutter for regulating diffusion of said additive into said fluid, said plurality of apertures of a size particular to the type of said additive, said diffusion filter intermediate to said reservoir chamber and said fluid conduit when said when said opening, said fluid conduit window and said shutter window are aligned and thus controlling the rate of diffusion of fluid between said reservoir chamber and said fluid conduit.

16. The curry shampoo comb of claim 2 further comprising:
a reducer having a first end and a second end; said first end attachable to a fluid supply, said second end connected to said fluid inlet coupling;
a valve intermediate to said first end and said second end of said reducer, said valve capable of regulating fluid flow between zero flow and maximum flow.

17. The curry shampoo comb of claim 8 further comprising:
a reducer having a first end and a second end; said first end attachable to a fluid supply, said second end connected to said fluid inlet coupling;
a valve intermediate to said first end and said second end of said reducer, said valve capable of regulating fluid flow between zero flow and maximum flow.

18. The curry shampoo comb of claim 2 further comprising:
said distribution plate removably attached to said reservoir section.

* * * * *